(12) United States Patent
Wang et al.

(10) Patent No.: US 6,977,648 B1
(45) Date of Patent: Dec. 20, 2005

(54) SYSTEM AND METHOD FOR PROVIDING BACK-LIGHTING TO A KEYPAD

(75) Inventors: David E. Wang, San Diego, CA (US); Mahmoud Azartash, San Marcos, CA (US); Larry D. Bradley, San Diego, CA (US); Richard J. Kerr, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/182,626

(22) Filed: Oct. 29, 1998

Related U.S. Application Data

(60) Provisional application No. 60/065,306, filed on Nov. 13, 1997.

(51) Int. Cl.[7] .............................................. G09G 5/00
(52) U.S. Cl. ..................... 345/211; 345/102; 345/173; 341/22; 341/26; 455/566; 455/574
(58) Field of Search ............................... 345/179, 180, 345/102, 22, 23, 169–170, 173, 905; 379/433, 379/428, 433.12, 433.04, 433.02, 433.09; 455/556, 566, 553, 575, 403; 200/314, 5 A; 341/22, 26

(56) References Cited

U.S. PATENT DOCUMENTS 5,175,759 A * 12/1992 Metroka et al. .......... 455/569.1
5,189,632 A *  2/1993 Paajanen et al. ............ 708/109
5,414,443 A *  5/1995 Kanatani et al. ............... 345/95

(Continued)

FOREIGN PATENT DOCUMENTS

EP          0735700       12/1995     ............ H04B 3/36

(Continued)

Primary Examiner—Henry N. Tran
(74) Attorney, Agent, or Firm—Philip R Wadsworth; Charles D. Brown; George C Pappas

(57) ABSTRACT

A system for providing a first signal to a flip circuit and receiving a second signal from the flip circuit over an electrical path adapted for use with a keypad having a keypad lighting circuit. The system includes a first circuit for providing the first signal to the flip circuit via a first electrical path, the first signal having alternating first and second states. A second circuit generates a second signal. A third circuit receives the second signal via the first electrical path. The second signal is received during the second state of the first signal. In a more specific embodiment, the first and second states are continuously alternating states. The first signal provides power to the flip circuit when the first signal is in the first state. The first circuit further includes a signal generator for adjusting a duty cycle of the first signal. The signal generator includes a voltage source, a switching circuit connected to the voltage source, and a control circuit connected to the switching circuit. The control circuit causes the switching circuit to output the first signal having first and second states at the duty cycle. The switching circuit includes a transistor having a control terminal connected to the control circuit. One terminal is connected to the voltage source and another terminal is connected to the electrical path. The second circuit includes a keypad. The flip circuit includes at least one light source to illuminate the keypad. The light source is powered by the first signal during the first state thereof. The second signal is generated by the keypad during the second state of the first signal. The keypad includes a plurality of resistive elements connected in a resistive ladder network. Each resistive element corresponds to a respective key of the keypad. A computer processes the second signal to ascertain which key is depressed.

4 Claims, 6 Drawing Sheets

U.S. PATENT DOCUMENTS

| | | | |
|---|---|---|---|
| 5,436,954 A | * | 7/1995 | Nishiyama et al. .......... 455/566 |
| 5,555,157 A | * | 9/1996 | Moller et al. ................ 361/683 |
| 5,584,054 A | * | 12/1996 | Tyneski et al. ................ 455/89 |
| 5,797,482 A | * | 8/1998 | LaPointe et al. ............. 200/314 |
| 5,798,716 A | * | 8/1998 | Davis ........................... 341/26 |
| 5,915,015 A | * | 6/1999 | Thornton ..................... 379/433 |
| 5,918,188 A | * | 6/1999 | Doran ......................... 455/575 |
| 5,983,116 A | * | 11/1999 | Nash et al. .................. 455/550 |
| 6,002,946 A | * | 12/1999 | Reber et al. ................. 455/557 |
| 6,046,730 A | * | 4/2000 | Bowen et al. ............... 345/168 |
| 6,073,034 A | * | 6/2000 | Jacobsen et al. ............. 455/566 |
| 6,128,514 A | * | 10/2000 | Griffith et al. ............... 455/564 |
| 6,205,343 B1 | * | 3/2001 | Montgomery, Jr. ......... 455/574 |

FOREIGN PATENT DOCUMENTS

GB         2313273         5/1996         ............ H04B 3/54

* cited by examiner

SYSTEM AND METHOD FOR PROVIDING BACK-LIGHTING TO A KEYPAD

CROSS-REFERENCE TO RELATED APPLICATION

The present Application is at least partly based on a Provisional Patent Application entitled PULSE WIDTH MULTIPLEXED BACKLIGHTING, Ser. No. 60/065,306, filed Nov. 13, 1997.

BACKGROUND OF THE INVENTION

1. Field of Invention

This invention relates to mobile communications devices and mobile computing devices. Specifically, the present invention relates to systems for providing backlighting to a keypad in a cellular flip telephone or personal digital assistant.

2. Description of the Related Art

Mobile communications devices are used in a variety of demanding applications ranging from hand-held global positioning system (GPS) devices to cellular telephones and personal digital assistants (PDAs). Such devices must often be lightweight, energy-efficient, durable, cost-effective, and user-friendly.

These features are particularly important in PDAs and cellular telephones. A PDA such as a Palm Pilot™ or other palm-top computer typically includes a processor running software such as Windows CE®, a keypad for user interface with the software, and a large liquid crystal display (LCD) screen mounted on a chassis or body. In many PDAs, the keypad is located on the inside surface of a lid often referred to as a 'flip'. The flip is connected to the PDA body via a hinge mechanism so that when the flip is folded shut, the screen and the keypad are protected.

Typically, the hinge mechanism includes a flex circuit comprising flexible wire for routing signals across the hinge. Unfortunately, flex circuits readily fatigue and are difficult to route. This decreases the durability of the PDAs in which they are employed.

Often keypad backlighting is provided while the PDA receives user-input from the keypad. Typically, this requires a first flexible wire for providing power to several light emitting diodes (LEDs) in response to a control signal from a processor. The control signal is generated in response to user-input from the keypad. The processor reads user-input from the keypad via a second flexible wire. A third flexible wire provides a ground connection from the keypad to the PDA body. The use of three wires is inefficient and increases the probability of flex circuit fatigue.

Many PDA users also carry cellular telephones. Currently, to accommodate such users, many companies are integrating cellular telephones into their PDAs. To integrate a cellular telephone within a PDA, the PDA is typically equipped with a microphone, a cellular modem, a touch pad display screen, and a communications software package. When activated, the software displays a dialer interface on the touch pad screen that mimics the keypad on a typical cellular telephone. Unfortunately, activation of the software often requires extensive user knowledge and familiarity with the PDA and accompanying communications software package. As a result, such integrated devices are often not user friendly.

Hence, a need exists in the art for a user-friendly mechanism for making telephone calls with a PDA having an integrated cellular telephone. There exists a further need for a durable, cost effective, and space-efficient system and method to connect a keypad to its corresponding PDA body that can provide keypad backlighting and keypad reading functions over a single connection simultaneously.

SUMMARY OF THE INVENTION

The need in the art is addressed by the system for providing backlighting to a keypad of the present invention. The inventive system provides a first signal to a flip circuit and receives a second signal from the flip circuit over an electrical path. A first circuit provides the first signal to the flip circuit via the electrical path. The first signal has alternating first and second states. The flip circuit generates a second signal which is received by a third circuit via the electrical path. The second signal is received during the second state of the first signal.

In a more specific embodiment, the first and second states are continuously alternating states. The first signal provides power to the flip circuit when the first signal is in the first state. The first circuit further includes a signal generator for adjusting a duty cycle of the first signal. The signal generator includes a voltage source, a switching circuit connected to the voltage source, and a control circuit connected to the switching circuit. The control circuit causes the switching circuit to output the first signal having first and second states at the duty cycle. The switching circuit includes a transistor having a control terminal connected to the control circuit. One terminal is connected to the voltage source and another terminal is connected to the electrical path.

In the illustrative embodiment, the flip circuit includes a keypad and at least one light source for illuminating the keypad. The light source is powered by the first signal during the first state thereof. The second signal is generated by the keypad during the second state of the first signal. The keypad includes a plurality of resistive elements connected in a resistive ladder network, each resistive element corresponding to a respective key of the keypad. The system further includes a computer for processing the second signal.

The inventive system provides input from a keypad and provides lighting to the keypad over an electrical connection and includes a key detection circuit for sensing a signal over the electrical connection indicative of a key pressed on the keypad. A lighting circuit lights the keypad via the electrical connection. A multiplexing circuit selectively activates the lighting circuit and the key detection circuit at a predetermined rate. The predetermined rate is sufficient to make the lighting circuit and the keypad detection circuit appear to be activated simultaneously to a user of the keypad.

The inventive system may be implemented in a unique mobile communications device that includes a transceiver positioned within a personal digital assistant body. An onboard computer and accompanying analog-to-digital converter process signals transmitted and received by the transceiver. Input signals are provided by a user via a keypad. Pin contacts connect the flip circuit to the personal digital assistant body and accompanying circuits.

A timer, a multiplexing circuit, and the computer facilitate the implementation of first and second functions between the flip circuit and the PDA circuits via the pin contacts so that the first function and the second function appear to a user to be implemented simultaneously. In the illustrative embodiment, the first function is a lighting function to provide backlighting to the keypad while the second function is a keypad reading function for enabling the computer to read user-input from the keypad. The keypad is positioned on an exterior portion of a flip that houses the flip circuit. The PDA houses the computer, transceiver, and multiplexing circuit and has a hinge that physically connects the flip to the body.

The unique design of the present invention is facilitated by the use of a single pin contact plus a ground pin contact in place of three or more contacts/wires to perform these two functions. This results in a more durable device. The use of the two pin contacts is enabled via the unique multiplexing circuit of the present invention that provides for the apparent simultaneous keypad backlighting and keypad reading of user-input. In the present invention, the electrical connection between the PDA body and keypad includes an electrical path for ground and an electrical path for power and/or signal information. Furthermore, positioning the keypad on an exterior portion of the flip provides for an easily recognized and user-friendly user-interface to the cellular telephone.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
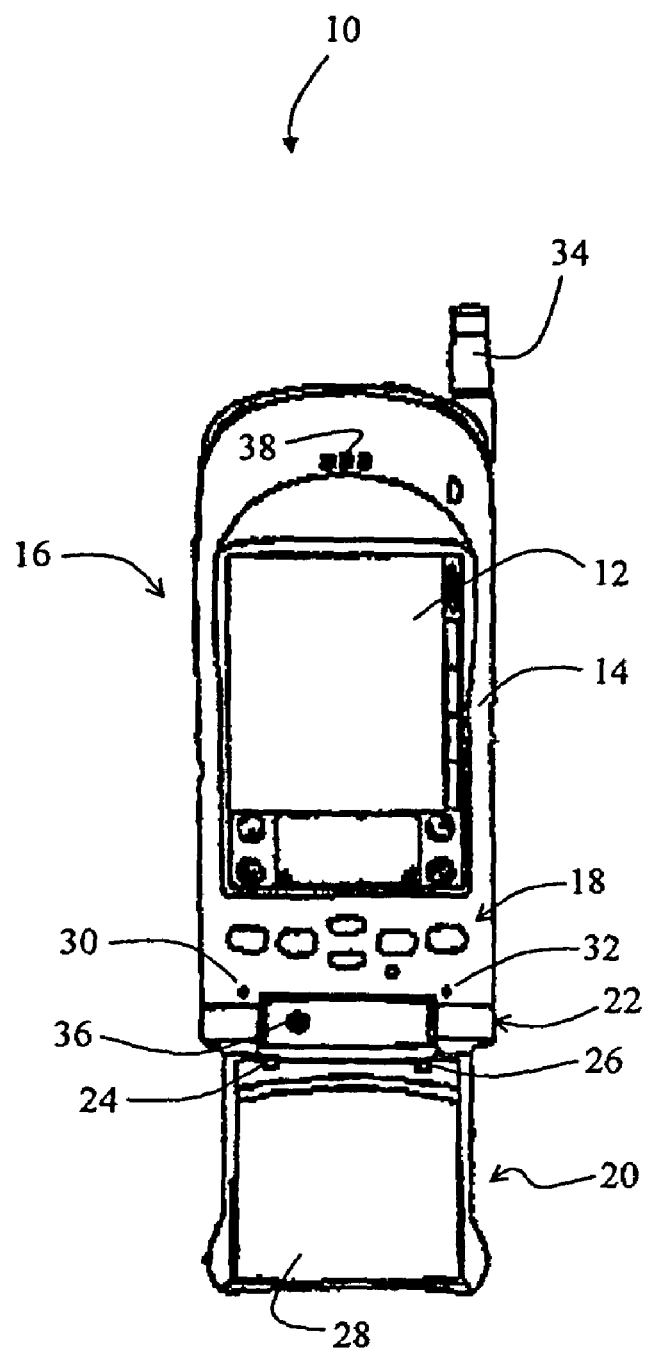
FIG. 1 is a front view of a personal digital assistant (PDA) incorporating a cellular telephone constructed in accordance with the teachings of the present invention.

FIG. 1 is a front view of a PDA 10 incorporating a cellular telephone constructed in accordance with the teachings of the present invention. The PDA 10 includes a large liquid crystal display (LCD) 12 located on a front face 14 of a body 16 of the PDA 10. In the illustrative embodiment, the LCD 12 is approximately centered on the front face 14 of the body 16 and covers approximately 54% of the surface area of the front face 14. PDA buttons 18 are positioned on the front face 14 directly below the LCD 12. A flip 20 is connected at the bottom of the front face 14 of the PDA 10 via a flip hinge 22. A first electrical pin contact 24 and a second electrical pin contact 26 are located on an interior surface 28 of the flip 20. A first spring-loaded pogo pin 30 and a second spring-loaded pogo pin 32 are positioned on the front face 14 near the flip hinge 22. A microphone 36 is positioned near the bottom of the PDA body 16. A speaker 38 is positioned near the top of the PDA body 16.

As is discussed more fully below, a cellular phone dialing keypad is positioned on an exterior surface of the flip 20. In addition, the PDA 10 includes an antenna 34 that is connected to a transceiver that is connected to a PDA computer in the PDA body 16.

The flip 20 is closed by folding the flip 20 about the hinge 22 so that the interior surface 28 of the flip 20 faces the keys 18 and the LCD 12 on the front surface 14 of the PDA 10.

When the flip 20 is closed, the first pin contact 24 and the second pin contact 26 make electrical contact with the first spring-loaded pogo pin 30 and the second spring-loaded pogo pin 32, respectively. In addition, when the flip 20 is closed, the keys 18 and a lower portion of the LCD 12 are protected.

When the flip 20 is closed and the first and second pogo pins 30 and 32, make electrical contact with the first and second pin contacts 24 and 26, respectively, communications software running on a PDA computer (as discussed more fully below) is activated. A keypad located on an exterior portion of the flip 20 acts as a typical cellular telephone keypad, thereby providing an easily recognized cellular telephone user interface. The buttons 18 on the front face 14 of the PDA body 16 allow for user-input to the PDA computer when the flip 20 is open.

Figure 2:
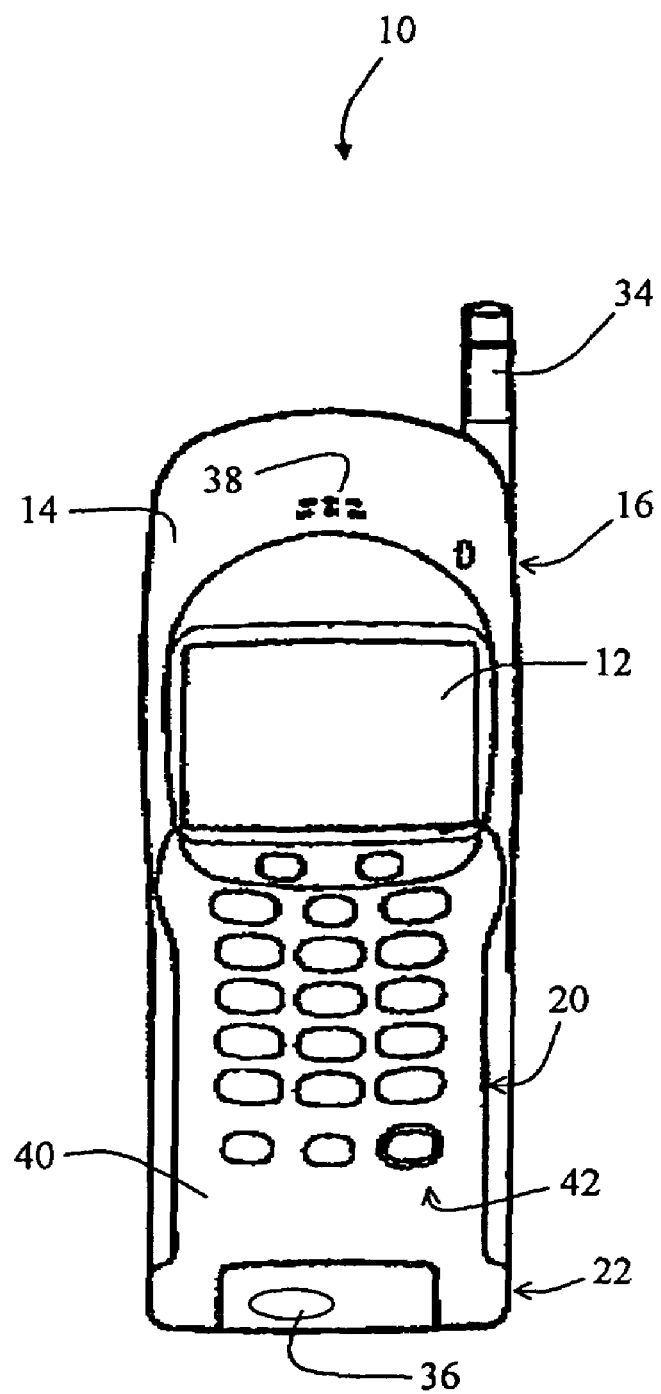
FIG. 2 is a front view of the PDA of FIG. 1 when a flip portion of the PDA is closed.

FIG. 2 is a front view of the PDA 10 of FIG. 1 with the flip 20 closed. When the flip 20 is closed, an exterior surface 40 is exposed. A cellular telephone keypad 42 is built into the exterior surface 40. The microphone 36 is positioned near the bottom of the PDA body 16 for receiving voice input to the PDA computer and/or transceiver system (as discussed more fully below). The flip 20 is designed so that the microphone 36 is exposed when the flip 20 is closed.

When the flip 20 is closed, a portion of the LCD 12 is exposed, which acts as a cellular telephone display. When the flip 20 is closed, the PDA 10 resembles a cellular telephone and performs similar functions as a cellular telephone. Hence, the PDA 10 provides a user-friendly, and easily recognized cellular telephone user interface.

Figure 3:
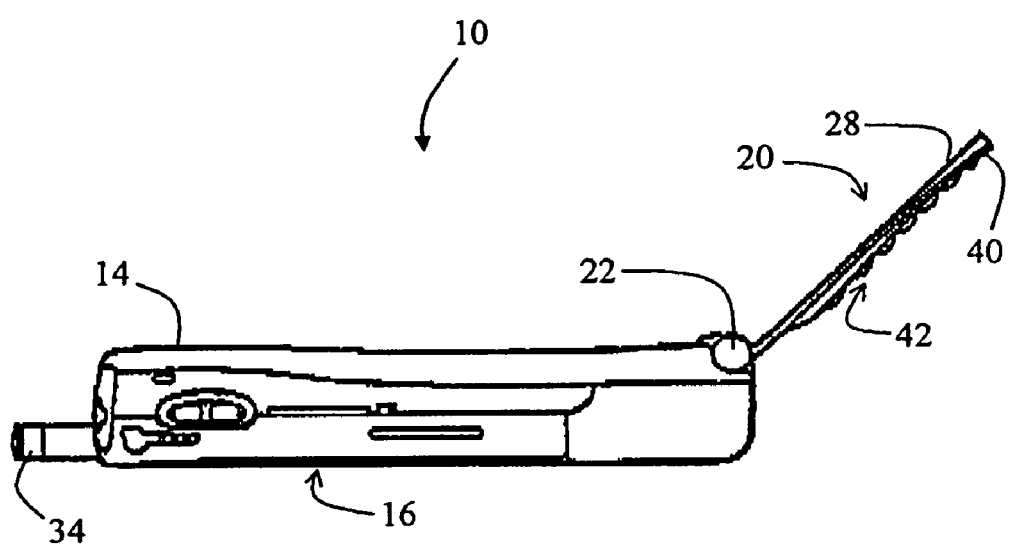
FIG. 3 is a side view of the PDA of FIG. 1.

FIG. 3 is a side view of the PDA 10 of FIG. 1 illustrating how the flip 20 folds open about the hinge 22. In the illustrative embodiment, the PDA 10 functions as a PDA when the flip 20 is open.

Figure 4:
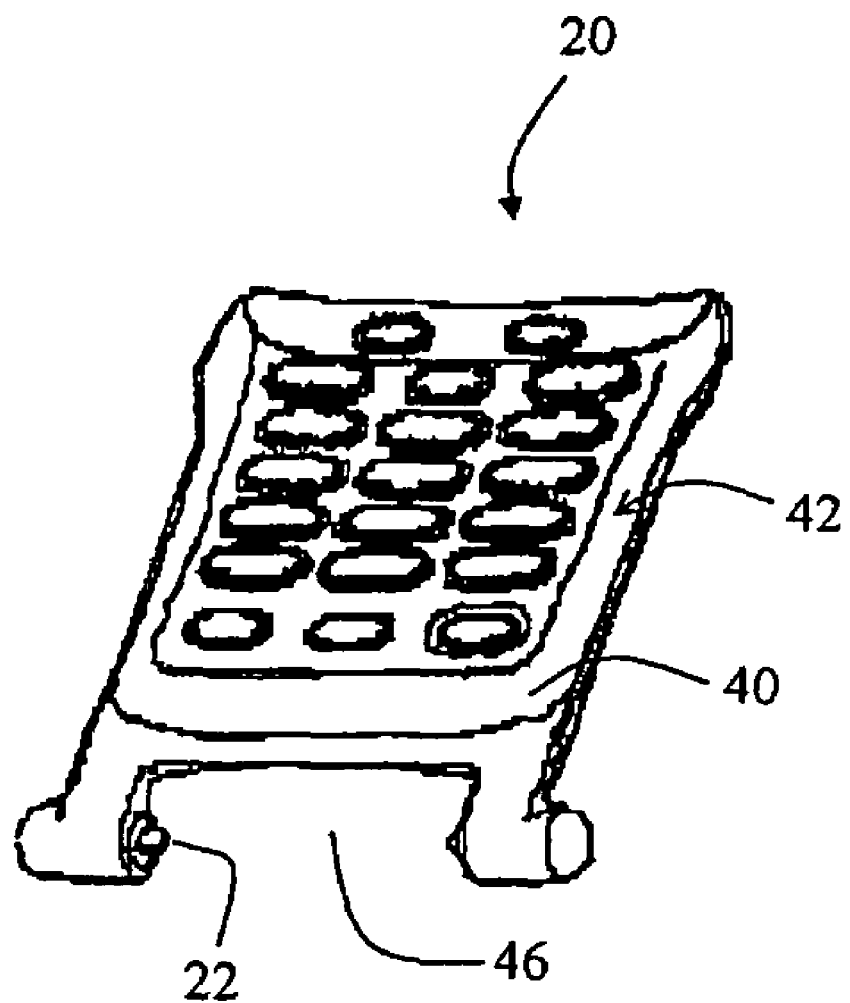
FIG. 4 is a more detailed diagram of the flip of the PDA of FIG. 1.

FIG. 4 is a more detailed diagram of the flip 20 of the PDA 10 of FIG. 1. The cellular telephone keypad 42 is shown positioned on the exterior surface 40 of the flip 20. With reference to FIGS. 3 and 4, a gap 46 near the hinge 22 is sized so that when the flip 20 is closed, the microphone 36 on the PDA body 16 is exposed.

Figure 5:
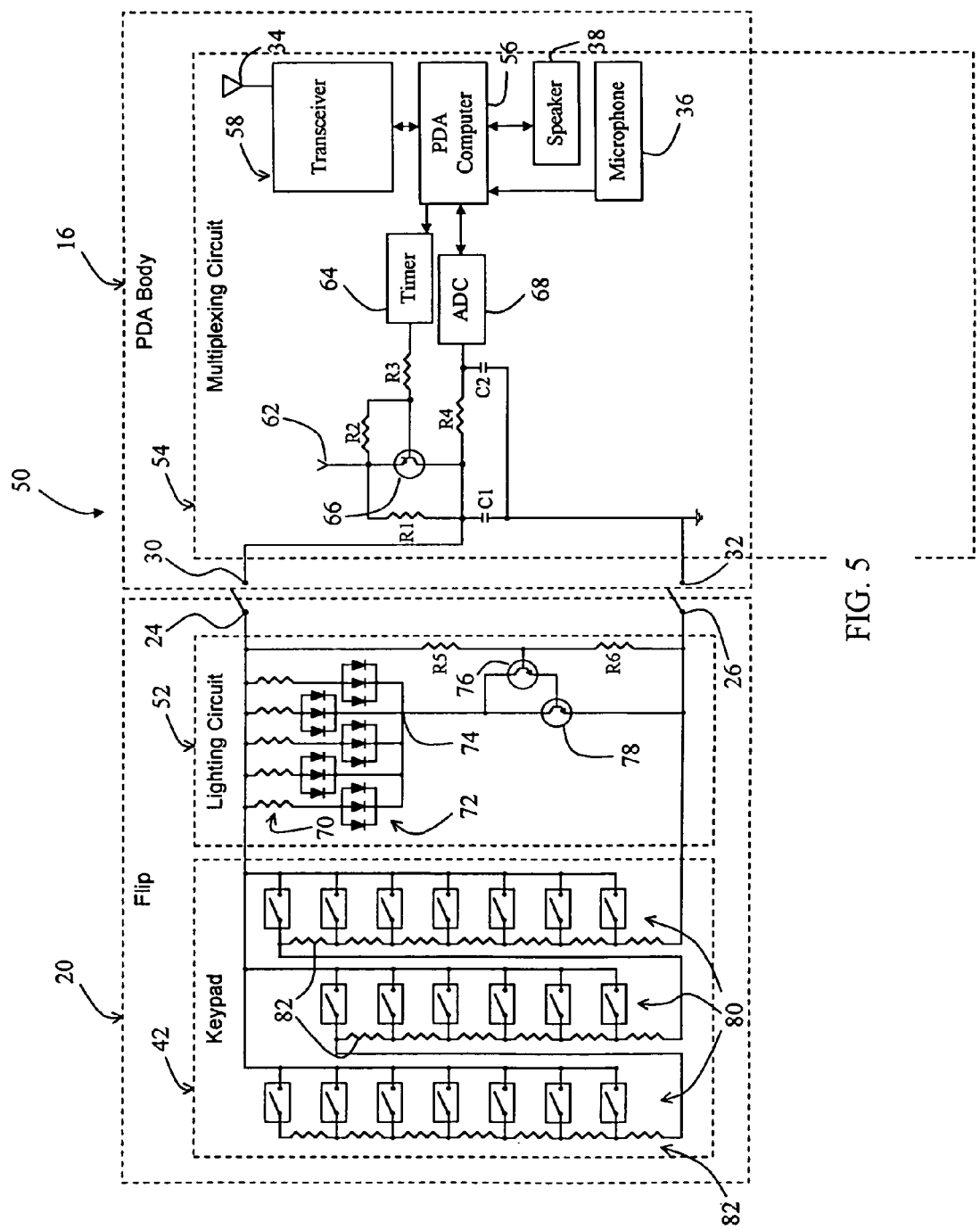
FIG. 5 is a diagram of a circuit adapted for use with the PDA of FIG. 1.

FIG. 5 is a diagram of a PDA circuit 50 adapted for use with the PDA 10 of FIG. 1 and allowing for backlighting of the keypad 42 while receiving user-input from the keypad 42. On the flip 20, the PDA circuit 50 includes, from left to right, the keypad 42 connected to a lighting circuit 52, and the first and second pin contacts 24 and 26, respectively. On the PDA body 16, the PDA circuit 50 includes, from left to right, the first and second spring-loaded pogo pins 30 and 32, respectively, and a multiplexing circuit 54. The multiplexing circuit 54 is connected to a PDA computer 56 that is connected to the speaker 38, the microphone 36, and a transceiver 58 that is in communication with the antenna 34.

The multiplexing circuit 54 includes a first resistor R1 connected at one end to a high voltage source ($V_S$) 62 and at the other end to the first pogo pin 30 which is also connected to one end of a first capacitor C1 and one end of a fourth resistor R4. The high voltage source 62 is also connected to one end of a second resistor R2, the other end of which is connected to the base of a PNP transistor 66. The emitter of the PNP transistor 66 is connected to the high voltage source 62. The collector of the PNP transistor 66 is connected to the first pogo pin 30. The base of the PNP transistor 66 is also connected to one end of a third resistor R3, the other end of which is connected to an output of a programmable timer 64 that is connected to the PDA computer 56. One end of the fourth resistor R4 is connected to the first pogo pin 30 where the collector of the PNP transistor 66, the first resistor R1, and one end of the first capacitor C1 are connected. The other end of the fourth resistor R4 is connected to an input of an analog-to-digital converter (ADC) 68 and to one end of a second capacitor C2. The other end of the first capacitor C1 and the other end of the second capacitor C2 are connected to the second pogo pin 32, and are connected to ground. The ADC 68 is also connected to the PDA computer 56.

Those skilled in the art will appreciate that the multiplexing circuit 54 may be easily implemented without the PNP transistor 66, i.e., the PNP transistor 66 may be replaced with another switching device such as an NPN transistor without departing from the scope of the present invention. In addition, those skilled in the art can easily construct the software running on the PDA computer 56.

The pin contacts 24 and 26, together with the pogo pins 30 and 32 form a single throw double pole switch that electrically connects the keypad 42 and the lighting circuit 52 to the multiplexing circuit 54 when the flip 20 is closed. The second pin contact 26 is grounded via the second pogo pin 32 when the flip 20 is closed. The pin contact provided for ground may be omitted without departing from the scope of the present invention. For example, the ground connection may be provided internally on the flip rather than on the personal digital assistant body.

In operation, software running on the computer 56 sets the frequency of the timer 64 to a predetermined frequency. In the present specific embodiment, the predetermined frequency is greater than or equal to 60 Hz to minimize the appearance of flicker in the lighting circuit 52. The timer 64 is a signal generator, which may also be considered a frequency generator, that generates a square wave voltage output signal that, in the present embodiment, has approximately a 50% duty cycle. The duty cycle of a square wave signal having square or rectangular pulses is the ratio of the width of a pulse in the signal to the period (the reciprocal of the frequency) of the signal expressed as a percentage as is discussed more fully below.

The low voltage state of the square wave signal is sufficient to turn on the PNP transistor 66 through the third resistor R3 connected to the base of the PNP transistor 66. When the PNP transistor 66 is on, current flows from the high voltage source 62 through the PNP transistor 66 to the first pogo-pin 30. Hence, the voltage at the first pogo pin 30 is Vs minus the voltage drop ($V_{EC}$) between the emitter and collector of the PNP transistor 66 when the voltage state of the square wave output from the programmable timer 64 is in the low state. The voltage state ($V_S - V_{EC}$) on the first pogo pin 30 is high. The high voltage state is ($V_S - V_{EC}$).

The values of R2 and R3 are picked so that when the square wave output of the timer 64 is in the high state, the PNP transistor 66 is off, and approximately no current flows through the PNP transistor 66 between the emitter and collector. The voltage at the first pogo pin 30 is then $V_S$ minus the voltage ($V_{R1}$) drop across the first resistor R1. The value of R1 is relatively large so that when the square wave is in the high state, the voltage state at the first pogo pin 30 is low. The low state is approximately zero volts as voltage remaining at the first pogo pin 30 drains through the resistors R5 and R6 to ground.

The values of the first capacitor C1 and the second capacitor C2 are set so that the capacitors remove any undesirable alternating current components in the signals transferred along the first pogo pin 30 and to the ADC 68. The voltage $V_S$ is approximately 3.3 volts but may vary from application to application.

When the voltage state of the pogo pin 30 high and the flip 20 is closed, the high voltage state is transferred to the pin contact 24 connected to the lighting circuit 52. The lighting circuit 52 is activated in response to the high state on the pin contact 24. The lighting circuit 52 includes five resistors 70 connected at the pin contact. The opposite ends of the parallel resistors are connected to five light emitting diode (LED) circuits 72. Each LED circuit 72, in the present embodiment, includes three LEDs with a common anode and a common cathode. Each common anode is connected to one of the five parallel resistors 70. The common cathodes of the LED circuits 72 are connected to a common node 74. The node 74 is connected to the collector of a first NPN transistor 76 and to the collector of a second NPN transistor 78. The base of the second NPN transistor 78 is connected to the emitter of the first NPN transistor 76. The emitter of the second NPN transistor 78 is connected to the second pin contact 26 that represents a ground connection when the flip 20 is closed. The base of the first NPN transistor 76 is connected to one end of a fifth resistor R5 and to one end of a sixth resistor R6. The other end of the fifth resistor R5 is connected to the first pin contact 24. The other end of the sixth resistor R6 is connected to the second pin contact 26.

When the node corresponding to the first pin contact 24 is in the high voltage state the LEDs in the LED circuits 72 turn on. In addition, first NPN transistor 76 and the second NPN transistor turn on. Current flows from the high voltage state at the first pin contact 24 through the parallel resistors 70, through the LED circuits 72 and through the second NPN transistor 78. The LEDs in the LED circuits 72 light up, providing backlighting to the keypad 42, which is implemented via a resistor ladder network. The lighting circuit 52 is de-activated while the first pin contact 24 is in the low voltage state wherein the NPN transistors 76 and 78 are off and the LED circuits 72 are off.

The values of the parallel resistors 70, the fifth resistor R5 and the sixth resistor R6 are chosen to minimize the power consumption of the lighting circuit 52 while providing sufficient backlighting to the keypad 42 in the high state to suit a particular application. The backlighting is off in the low state.

When the node corresponding to the first pin contact 24 is in the low voltage state and the flip 20 is closed, the keypad 42 is activated. The keypad 42 includes a plurality of keys 80, each connected at one end to the node corresponding to the pin contact 24. The keys 80 are connected at the other end to resistor ladder resistors 82 that are connected in series. The keys 80 are implemented as switches. When a given key 82 pressed, the electrical resistance between the first pin contact 24 and the second pin contact 26 changes to a unique value based on the number and resistances of the resistors 82 between the key being pressed and the second pin contact 26. The unique resistance provides a unique voltage at the first pin contact 24 representative of the specific key being pressed. Similarly, if no key is pressed, the voltage at the first pin contact 24 is a unique voltage based on the voltage drop across the first resistor R1, the fifth resistor R5, and the sixth resistor R6. The voltage during the low voltage state at the first pin contact 24 varies depending on which key was pressed. The keypad is de-activated while the first pin contact 24 is in the high voltage state. This is because, when the first pin contact 24 is in the high voltage state, a changing of the electrical resistance of the keypad 42 when a key is pressed will not adequately modulate the voltage at the first pin contact 24, but instead will modulate current. This is because the voltage at the first pin contact 24 is effectively tied to the high voltage source (Vs) 62 through the PNP transistor 66 when the first pin contact 24 is in the high voltage state. Pressing a key on the keypad 42 will not significantly change the high voltage state, but will cause a variation in the current (I) in accordance with the relation I=(Vs−$V_{EC}$)/R, where $V_{EC}$ is the voltage drop across the PNP transistor 66 and R is the resistance between the first pin contact 24 and the second pin contact 26 associated with the pressing of a given key on the keypad 42.

Those skilled in the art will appreciate that the keypad 42 may be replaced by another type of keypad such as a keypad with a different type of resistor ladder without departing from the scope of the present invention.

The unique voltage is transferred to the ADC 68 on the PDA body 16 via the fourth resistor R4 and the first pogo pin 30 where it is converted to a digital signal readable by the PDA computer 56. The computer 56 determines if any key was pressed on the keypad 42 and which key was pressed if a key was pressed, by reading the digital signal.

The lighting circuit 52 and the keypad 42 are selectively activated in sync with the output of the timer 64 when the flip 20 is closed. When the output of the timer 64 is in the low state, the PNP transistor 66 turns on and the pin contact 24 maintains a high voltage state that activates the lighting circuit 52. The activated lighting circuit 52 provides backlighting to the keypad 42. Similarly, when the output of the timer is in the high voltage state, the PNP transistor 66 is off, and the pin contact 24 is in low voltage state. The keypad 42 is activated. The low voltage state at the first pin contact 24 facilitates the establishment of a unique voltage via the resistors 82 at the first pin contact 24 that is different for each key 80 that is pressed.

The PDA computer 56 sets the frequency of the timer 64 so that the rate at which the lighting circuit 52 and the keypad 42 are alternately activated is sufficiently high to effectively backlight the keypad 42 without flicker while enabling the reading of user-input from the keypad 42 by the computer 56. When the output of the timer 64 is approximately 60 Hz or greater, the keypad 42 appears to be activated simultaneously with the lighting circuit 52. However, those skilled in the art will appreciate that lower or higher frequencies may be used for this purpose without departing from the scope of the present invention.

The PDA computer 56 runs software that is easily constructed by those ordinarily skilled in the art to read the output of the ADC 68 when the output of the timer 64 is in the high state, i.e., when the pin contact 24 is in the low state, the keypad 42 is activated and the lighting circuit 52 is de-activated.

The PDA computer 56 also receives microphone input 36 such as voice. The voice may then be directed to the transceiver 58 for transmission to another cellular telephone user. Similarly, another cellular telephone user can broadcast signals that are received via the transceiver 58 and relayed to the speaker via the computer 56 or other circuitry (not shown).

Figure 6:
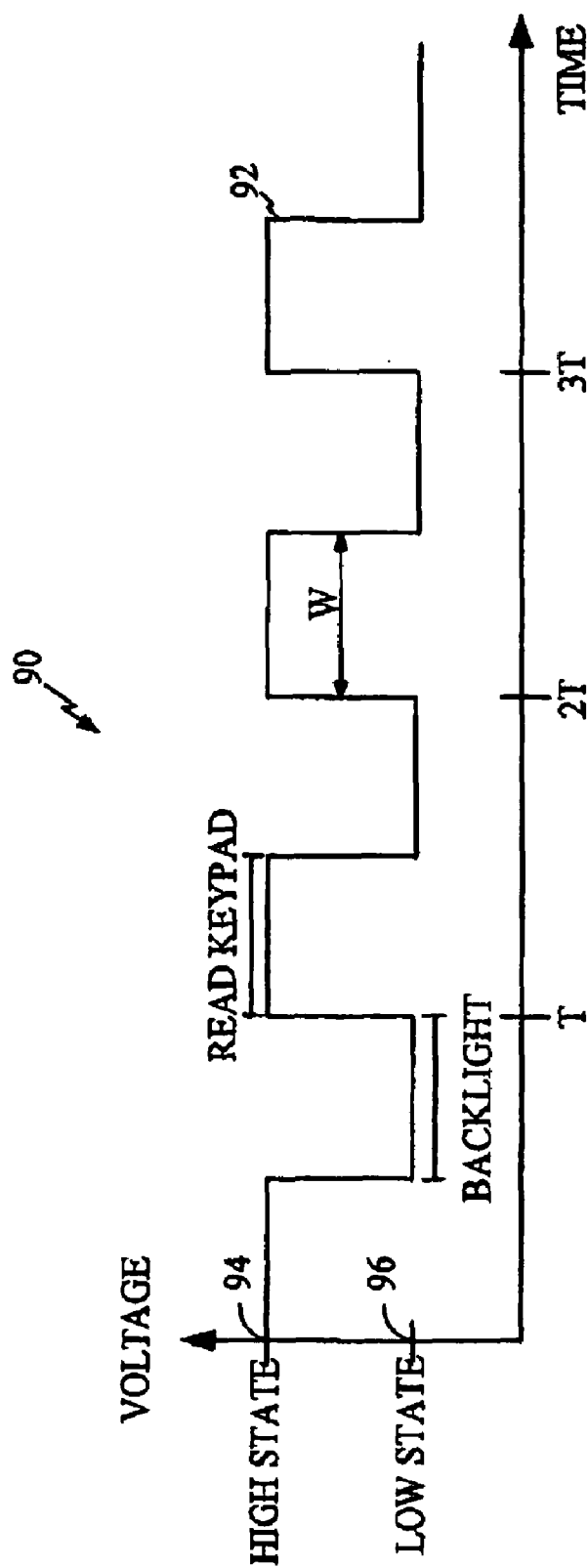
FIG. 6 is a graph of a signal output from the timer of the PDA of FIG. 5 having a 50% duty cycle.

FIG. 6 is a graph 90 of a square wave signal 92 output from the timer 64 of the PDA 50 of FIG. 5 having a 50% duty cycle. The square wave signal 92 has a high state 94 and a low state 96. The ratio of the pulse width W to the period T of the square wave signal 92 is the duty cycle of the signal and is 50% in the illustrative embodiment. The pulse width W corresponds to the time duration in which the square wave signal 92 is in the high state 94.

With reference to FIGS. 5 and 6, when the square wave signal 92 is in the high state 94, the keypad 42 is read via the ADC 68 and the PDA computer 56. When the square wave signal 92 is in the low state 96, the keypad 42 is backlit via the voltage source (Vs) 62.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A mobile communications device comprising:
a flip comprising a keypad and a keypad lighting circuit;
a body connected to the flip by a hinge;
a pin contact having a conductance dependent on the position of the flip relative to the body, the body comprising a multiplexing circuit configured to alternate between connecting a power supply to the keypad lighting circuit and connecting the keypad to a computer through the pin contact, at a rate allowing a connection to the keypad lighting circuit to appear continuous to a user.

2. A mobile communications device in accordance with claim 1, wherein the rate is greater than 30 HZ.

3. A mobile communications device in accordance with claim 2, wherein the rate is approximately 60 Hz.

4. A mobile communications device in accordance with claim 1, the multiplexing circuit comprising:
a timer,
a transistor connected to an output of the timer, the transistor configured to bypass a resistor to a high voltage in response to a state of the output to provide a voltage at the pin contact alternating between a high voltage and a low voltage.

* * * * *